(12) United States Patent
Steffens et al.

(10) Patent No.: US 12,443,451 B2
(45) Date of Patent: Oct. 14, 2025

(54) METHOD FOR THE COMPUTER-AIDED EXECUTION OF A TECHNICAL PROCESS IN PROCESSING UNITS, COMPUTING ENVIRONMENT, AND STORAGE MEDIUM

(71) Applicant: Siemens Mobility GmbH, Munich (DE)

(72) Inventors: Sonja Steffens, Evessen (DE); Michael Hofer, Uitikon (CH); Matthias Bolz, Braunschweig (DE); Stefan Gerken, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/901,209

(22) Filed: Sep. 30, 2024

(65) Prior Publication Data
US 2025/0110790 A1 Apr. 3, 2025

(30) Foreign Application Priority Data
Sep. 28, 2023 (EP) .................................. 23200601

(51) Int. Cl.
*G06F 9/50* (2006.01)
(52) U.S. Cl.
CPC .................................. *G06F 9/5027* (2013.01)
(58) Field of Classification Search
None
See application file for complete search history.

(56) References Cited

U.S. PATENT DOCUMENTS 6,122,756 A * 9/2000 Baxter ................. G06F 13/36
714/E11.16
6,363,496 B1 * 3/2002 Kwiat .................. G06F 11/181
714/E11.069

(Continued)

FOREIGN PATENT DOCUMENTS

DE  10 2014 219 179 A1  3/2016
DE  10 2016 215 345 A1  2/2018
EP      3 411 858 A1  12/2018

OTHER PUBLICATIONS

Engelmann et al.; "Redundant Execution of HPC Applications With MR-MPI"; Oak Ridge National Laboratory, Oak Ridge, TN, USA; (Engelmann_2011.pdf) (Year: 2011).*

(Continued)

*Primary Examiner* — Hiren P Patel
(74) *Attorney, Agent, or Firm* — Laurence A. Greenberg; Werner H. Stemer; Ralph E. Locher (57) ABSTRACT

A method executes a technical process by executing application programs redundantly in a redundancy group containing a plurality N of computing entities and thereby calculate a plurality N of redundant results. A comparison of the messages containing the results is performed. When a majority of the messages contain identical results the majority of messages is used for further execution of the technical process. Processing units are formed from a plurality of computing entities being combined in each of the processing units, wherein none of these processing units contains a plurality of computing entities from the same redundancy group. The generated redundant messages are compared to determine if the messages are to be sent as external messages to computing entities, which do not belong to the processing units. No comparison is carried out for messages that are exchanged as internal messages between computing entities within a processing unit.

9 Claims, 4 Drawing Sheets

(56) References Cited

U.S. PATENT DOCUMENTS

| | | | |
|---|---|---|---|
| 8,412,980 B2* | 4/2013 | Hickey | G06F 9/3867 |
| | | | 714/10 |
| 10,366,557 B2* | 7/2019 | Eckelmann-Wendt | |
| | | | H04L 9/3247 |
| 10,719,356 B1* | 7/2020 | Corbett | G06F 9/5027 |
| 11,334,451 B2 | 5/2022 | Eckelmann-Wendt et al. | |
| 11,803,420 B1* | 10/2023 | Kinney, Jr. | G06F 9/5005 |
| 11,822,326 B2* | 11/2023 | Kong | G06F 11/1494 |
| 11,876,533 B2* | 1/2024 | Schallenberg | H03M 13/611 |
| 2005/0204184 A1* | 9/2005 | Endo | G06F 11/1425 |
| | | | 714/E11.069 |
| 2005/0273653 A1* | 12/2005 | Zubkow | G06F 11/181 |
| | | | 714/E11.069 |
| 2006/0080678 A1* | 4/2006 | Bailey | G06F 21/53 |
| | | | 719/325 |
| 2006/0242456 A1* | 10/2006 | Kondo | G06F 11/1658 |
| | | | 714/6.12 |
| 2007/0234296 A1* | 10/2007 | Zorn | G06F 11/1494 |
| | | | 717/124 |
| 2007/0234297 A1* | 10/2007 | Zorn | G06F 11/3612 |
| | | | 717/124 |
| 2010/0192164 A1* | 7/2010 | Golm | G06F 9/52 |
| | | | 719/319 |
| 2015/0234693 A1* | 8/2015 | Palframan | G06F 11/004 |
| | | | 714/37 |
| 2016/0026166 A1* | 1/2016 | Gamer | G05B 19/0428 |
| | | | 700/81 |
| 2016/0299839 A1* | 10/2016 | Biewer | G06F 15/17325 |
| 2016/0314057 A1 | 10/2016 | De Oliveira et al. | |
| 2018/0267866 A1* | 9/2018 | Venu | G06F 11/1658 |
| 2018/0349235 A1* | 12/2018 | Freydel | G06F 11/182 |
| 2020/0052890 A1* | 2/2020 | Baron | H04L 9/085 |
| 2020/0175168 A1 | 6/2020 | Völp et al. | |
| 2022/0169140 A1* | 6/2022 | Yang | G06F 9/5027 |
| 2023/0315590 A1* | 10/2023 | Bruno | G06F 11/3414 |
| | | | 714/4.11 |
| 2023/0350746 A1* | 11/2023 | Huang | G06F 11/14 |

OTHER PUBLICATIONS

Ulbrich et al.; "Eliminating Single Points of Failure in Software-Based Redundancy"; 2012 Ninth European Dependable Computing Conference; © 2012 IEEE; DOI 10.1109/EDCC.2012.21 (Ulbrich_2012.pdf; pp. 49-60) (Year: 2012).*

Nagengast et al.; Synchronization Techniques for Parallel Redundant Execution of Applications; ARCS 2019 Workshop Proceedings; ISBN 978-3-8007-4957-7; (Nagengast_2019.pdf; pp. 137-144) (Year: 2019).*

Weiherer et al. "Software-Based Triple Modular Redundancy with Fault-Tolerant Replicated Voters"; ARCS 2019 Workshop Proceedings; (Weiherer_2019.pdf; pp. 145-152) (Year: 2019).*

Steffens, Sonja et al., The development of the new DS3 safety platform—from the research project to commissioning, Signal + Draht (113) Jun. 2021, pp. 52-59.

* cited by examiner

METHOD FOR THE COMPUTER-AIDED EXECUTION OF A TECHNICAL PROCESS IN PROCESSING UNITS, COMPUTING ENVIRONMENT, AND STORAGE MEDIUM

CROSS-REFERENCE TO RELATED APPLICATION

This application claims the priority, under 35 U.S.C. § 119, of European Patent Application EP 23200601.5, filed Sep. 28, 2023; the prior application is herewith incorporated by reference in its entirety.

FIELD AND BACKGROUND OF THE INVENTION

The invention contains the following subject matter: a method for executing a technical process. The invention also contains the following subject matter: a computing environment having a plurality of computing entities. The invention also contains the following subject matter: a computer program having program commands. The invention also contains the following subject matter: a storage medium which can be read by a computer.

For functionally safe applications in the railroad environment in accordance with EN50128, EN50129 with a or SIL>2, various measures are required to ensure functional safety, including freedom from faults. The requirements for the certification of safety-relevant applications, for example in railroad technology, are very high. In accordance with standard EN 50129, a distinction is made between four safety integrity levels (SIL) or safety requirement levels for the required functional safety for safety functions. Safety integrity level 4 represents the highest level of safety integrity and safety integrity level 1 the lowest. The respective safety integrity level influences the confidence interval of a measured value to the effect that the higher the safety integrity level to be fulfilled by the respective device, the smaller the confidence interval. The functional safety dimension of the various safety integrity levels can be clearly described with the expected frequency of a failure of the safety-related system, the MTBF (Mean Time Between Failures), this being specified in years (a). For SIL-1, this is in the range of 10 . . . 100 a, for SIL-2 in the range of 100 . . . 1,000 a, for SIL-3 in the range of 1,000 . . . 10,000 a, and for SIL-4 in the range of 10,000 . . . 100,000 a.

A key measure here is the processing in independent computing entities that are either sufficiently independent and/or sufficiently error-free to guarantee the required level of safety. To merge the independent processing of a group of computing entities, a comparator, also known as a voter, is required, which checks the identity of the processing results and approves the checked result for further processing by the same or other computing entities in the event of equality or at least a successful majority decision.

A comparator, also known as a voter, is a device for determining the functionality of redundant systems. Majority decision systems, or MooN systems for short, are classified as active redundancy (majority redundancy). They are used as a means of increasing the fault tolerance of systems for which a high level of functional safety against failure or the occurrence of faults is required. MooN systems can have various architectures. Practical applications can be found in simplex (1oo2), duplex (2oo2), triplex (2oo3) and quadruplex (3oo4) architectures. The results of the MooN systems are compared by the majority decision-maker (voter) in order to pass on the result to the majority. The result is passed on as long as at least M of the N systems function (e.g. applies to hardware components and machines) or M of the N results match when comparing (e.g. applies to data and measured values). Otherwise, the entire system is considered to have failed and an error can be output.

A voter can be implemented using software or hardware. A software-based voter consists of a program module for comparison, also known as voting, which processes the above-mentioned results as input and generates an error or an approval as output. At the hardware level, a voter can also be configured as an analog computer that carries out voting by logically linking the components of the analog computer. In particular, a program module can also run on a processor that is not itself involved in generating the results. This results in a separation at the hardware level of the tasks of generating the results on the one hand and of evaluating the results by comparing them on the other. This has the advantage that the method steps of generating the results and comparing the results can influence each other less, thereby increasing the operational safety of the comparison process.

Voting is significantly complex and also requires strict synchronization between the independent computing entities so that parallel-generated and therefore identical results are simultaneously available for the voting carried out in the voter. This effort is heavily dependent on the underlying solution approach (solved at hardware and/or software level) and increases significantly if the solution is implemented at the software level. In the context of a desirable use of COTS (Commercial-off-the-Shelf) hardware instead of very specific, proprietary hardware solutions, it is, however, essential to secure the processes with suitable software, on the one hand with regard to the processing reliability of the processes that are running and on the other hand with regard to the synchronization of the processes, i.e. waiting for all results in the form of redundant messages to be compared as a prerequisite for reliable voting. This is a key problem.

According to the prior art, such independent processing units are run on a processor (a CPU or a computing core of the CPU) to achieve functional safety, for which known and sufficient methods for deterministic processing (e.g. task prioritization) exist. A comparison of the results therefore leads with a high degree of reliability to the conclusion that the independent processing results are identical. This concept is, for example, described by S. Steffens et. al. in the article entitled "Entwicklung einer neuen Safety-Plattform DS3—vom Forschungsprojekt bis zur Inbetriebnahme", SIGNAL+DRAHT (113) 6/2021.

In the method described, when processing a plurality of functionally safe application programs in parallel, which work together cooperatively in the continuous exchange of messages in a network, synchronization and comparison are carried out separately for each application program before the messages checked in this way and thus safe (in terms of functional safety), are exchanged between the cooperating application programs. The above-mentioned sharp increase in the effort required to master the task thus accumulates over the number of application programs involved in such a way that the total response times for processing in such a network can increase significantly and even to an unacceptably high extent.

SUMMARY OF THE INVENTION

The object of the invention is to solve the described problems in the prior art. In particular, the object is to specify a method for executing a technical process, a computing environment containing a plurality of computing entities for executing the technical process, a computer program containing program commands, and a storage medium which can be read by a computer, the computing effort associated with a functionally safe execution of the method being kept as low as possible.

According to a first aspect of the invention, a method for the computer-aided execution of a technical process is described:

a) in which application programs are executed redundantly in a redundancy group consisting of a plurality N of computing entities and thereby calculate the plurality N of redundant results (messages being received, processed and transmitted in a manner known per se for executing the application programs, the latter if results of the execution of the application programs are to be transmitted to other computing entities or to other hardware components involved in the technical process), and b) a comparison of the plurality N of messages containing the results is then carried out in a voting, with c) in the event that a majority of the messages contain identical results, said majority of messages being used for further execution of the technical process.

To avoid misunderstandings, it should be noted at this point that individual claim features are numbered consecutively using small Latin letters without taking the claim numbering into account. This means that each letter appears only once in the entire set of claims, which makes it possible to clearly address the claim features concerned without mentioning the claim number. For this reason, however, the order of the letters is of no significance.

Where reference is made to a plurality of redundant results, this refers to the technical existence of multiple results in different messages, represented by different data sets, as a result of parallel calculations. In the context of the present invention, the term "multiple results" is also used even if they are identical and could also be regarded as one result in terms of information content. The results are sent and received in the form of messages by the computing entities involved. A majority of a plurality N of messages or results can also be equal to the plurality N of messages or results ("unanimous majority").

The useful content of a message relates to the result aimed at accomplishing a task to be completed by the technical process. At the same time, however, a message also stores content that is intended to control the processes running in the computing entities, which are preferably handled by service programs (more on this below). This content does not necessarily have to be identical for a comparison to lead to the statement that the results of a large plurality of compared messages are identical and should also be referred to as control content.

A device is computer-aided or computer-implemented if it has at least one computer or processor, or a method if at least one computer or processor executes at least one method step of the method.

A computing environment is an IT infrastructure consisting of components such as processors, storage units, programs and data to be processed with the programs, which are used to execute at least one application that has to perform a task. The IT infrastructure can also consist of a network of the aforementioned components.

A cloud (also known as a computer cloud or data cloud) is a computing environment for cloud computing. This refers to an IT infrastructure that is made available via network interfaces such as the internet. It usually includes storage space, computing power or software as a service, without these having to be installed on a computing entity using the cloud. The services offered as part of cloud computing cover the entire spectrum of information technology and include IT infrastructure, platforms, software and computing power, with the cloud provider distributing the resources offered to cloud users as required with the aim of making optimum use of the resources.

As high safety standards apply in railroad technology with regard to the function (operational safety) and vulnerability (transmission security) of computer-implemented solutions, the functionalities of a cloud used in railroad technology are usually limited in terms of their shared availability. Restrictions are therefore necessary, particularly with regard to access by a potentially unlimited number of cloud users. However, access must also be limited with regard to the sharing of computing resources by different computing entities in order to ensure the necessary redundancy. A technology that takes these restrictions into account for railroad technology is also referred to as a private cloud in the context of this invention, even if a private cloud only fulfills the technical features associated with cloud technology to a limited extent.

Computing entities (or entities for short) form functional units within a computing environment that can be assigned to applications (provided, for example, by a number of program modules) and can execute them. When executing the application, these functional units form physically (e.g. computer, processor) and/or virtually (e.g. program module) self-contained systems.

Computers are electronic devices with data processing capabilities. Computers can be, for example, clients, servers, handheld computers, communication devices and other electronic devices for data processing, which can have processors and storage units and can also be connected to a network via interfaces.

Processors can be, for example, converters, sensors for generating measurement signals or electronic circuits. A processor can be a central processing unit (CPU), a microprocessor, a microcontroller or a digital signal processor, possibly in combination with a storage unit for storing program commands and data. A processor can also be a virtualized processor or a soft CPU.

Storage units can be configured as computer-readable memory in the form of random-access memory (RAM) or data storage (hard disk or data medium).

Program modules are individual software functional units that enable a program sequence of method steps according to the invention. These software functional units can be implemented in a single computer program or in a plurality of computer programs communicating with each other. The interfaces created here can be implemented at the software level within a single processor or at the hardware level if a plurality of processors are used.

Interfaces can be at the hardware level, for example a wired or a wireless connection, or at the software level, for example an interaction between individual program modules of one or more computer programs.

According to the invention, it is provided that a plurality N of processing units is provided, with:

d) a plurality of computing entities being combined in each processing unit, each computing entity from one and the same redundancy group being assigned to a different processing unit, e) the respectively generated plurality N of redundant messages being compared in the voting if these are sent as external messages to computing entities outside the processing unit to which the computing entity generating the message to be compared belongs, and f) no voting being carried out for messages that are exchanged as internal messages between computing entities within a processing unit.

External messages could therefore also be described as the final results of a specific section of the technical process and internal messages as intermediate results. According to the invention, only the redundant final results that originate from different processing units (namely the plurality N of these processing units that form a redundancy group for the voting) are then checked. These are messages whose identity with regard to the useful content is essential for the functional safety of the process, so that errors can be excluded when these messages are transferred externally to other computing entities (which can preferably also be combined in processing units), taking into account the required safety level.

According to the invention, internal messages that are only sent and received by computing entities within the processing units are not compared. This is also unnecessary, since the processes running within the processing unit are protected from access from outside the processing units and the redundant processing of other messages of the plurality of messages also runs in other processing units, which excludes interference in the processes running in parallel. In other words, the parallelization process is raised from the level of the computing entities to a higher level of the processing units, so that the processes within a processing unit do not run redundantly and therefore advantageously do not need to be synchronized there, or at least much less frequently (more on this below).

The undesirable accumulation of tasks and the excessive delays associated therewith can be advantageously resolved with a paradigm shift based on the invention. This paradigm shift consists in the use of a plurality of computing entities which work together cooperatively, and in the continuous and asynchronous exchange of internal messages, and in any order, as a combined independent processing unit (hereinafter also referred to as a "bubble") and which ensure functional safety in a single subsequent comparison of the processing results (represented by external messages) of the plurality N of such processing units.

In order to achieve the functional safety of a plurality of combined independent processing units (the bubble), for each message to be transmitted by the processing unit to external (i.e. outside the bubble) subsystems or neighboring systems (hereinafter referred to as external message for short), a single safe comparison is sufficient via a sufficiently large set (plurality N) of messages with identical useful content (stored in data sections of the data sets concerned reserved for this purpose), which represent the results of the tasks to be performed by the computing entities. According to the invention, these messages have been previously generated by the processing units working in parallel. The prerequisite is that all computing entities of a redundancy group have been developed and configured in accordance with the requirements necessary for the desired functional safety SIL. For the messages transmitted between the individual computing entities within the processing unit (sent and received by computing entities) (hereinafter referred to as internal messages), voting can be advantageously omitted due to this attribute.

The effect is that fewer messages have to be compared in the voter overall (namely only the external messages and not the internal messages), which advantageously leads to a performance gain when processing the tasks. Apart from the elimination of the need to compare all messages, this performance gain is also due to the fact that the computing entities within the processing units can work in a performance-oriented manner and thus asynchronously to the other computing entities of a redundancy group, which means that the specification of cycle times in the processing unit and the idle times associated therewith can be avoided.

According to a further aspect of the invention, a computing environment having a plurality of computing entities is described, wherein a plurality N of computing entities are combined to form one of a plurality of redundancy groups and all computing entities in each redundancy group are set up to execute an application program redundantly.

According to the invention, the aspects of the invention explained above are determined by the fact that the computing environment is divided into a plurality N of processing units, with:

n) a plurality of computing entities being combined in each of these processing units, o) none of these processing units containing a plurality of computing entities from one and the same redundancy group, and that the computing environment has a computing entity that is set up, p) to compare as a voter in a voting a plurality N of redundant messages generated by the computing entities, in the event that these leave a processing unit as external messages, and q) not to compare messages in the event that these are exchanged as internal messages between computing entities within the processing unit.

The advantages associated with the described structure of the computing environment have already been described in connection with the method according to the invention and also apply in the same way to the computing environment when it is used to carry out the method according to the invention.

According to a further aspect of the invention, a computer program is described containing program commands which, when the program is executed by a computer, cause the computer to carry out the method according to the invention.

According to the invention, a computer program containing program modules with program commands is thus described, wherein the method according to the invention and/or its exemplary embodiments can be executed by means of the computer program and the advantages described are achieved with the execution.

According to a further aspect of the invention, a storage medium is described which can be read by a computer, on which the computer program product as claimed in the final preceding claim is stored.

In addition, according to a further aspect of the invention, a supply device for storing and/or providing the computer program in the form of a computer-readable storage medium is thus described. The supply device is, for example, a storage unit that stores and/or provides the computer program. Alternatively or additionally, the supply device is a network service, a computer system, a server system, in particular a distributed, for example cloud-based computer system or virtual computer system, which stores the computer program on a computer-readable storage medium and preferably supplies it in the form of a data stream.

The supply takes place in the form of program data records as a file, in particular as a download file, or as a data stream, in particular as a download data stream, of the computer program. The computer program is transferred to a computing environment using the supply device, for example, so that the method according to the invention can be executed in a computing entity of this computing environment.

General Exemplary Embodiments of the Invention

Variants describing developments of the invention are explained below without limiting the basic idea of the invention.

According to a variant, the aspects of the invention explained above are determined by the fact that the plurality of N processing units operate in work cycles, with:
  g) at the beginning of each work cycle, messages required for the work cycle and addressed to the computing entities of the processing unit concerned being transferred to this processing unit,
  h) subsequently, all messages required for the execution of the application programs being processed by the computing entities in the plurality N of processing units in identical order, with new redundant messages being generated, and
  i) the new redundant messages then being compared with each other in steps b), c), d) and e) (see above).

According to this embodiment of the invention, a further problem is solved, which is to be explained using an example of 3 computing entities A, B, C of a processing unit (also referred to as AC1, AC2 and AC3 in FIGS. 2 and 4) in comparison with other processing units of one and the same redundancy group. In the event of a time offset (or jitter) occurring, for example, the computing entity B would receive messages from the computing entities A and C in the first processing unit in a different order than in the second or third (fourth . . . ) processing unit of the redundancy group concerned, which would result in different processing results in the various computing units of the redundancy group. Different here means both that the individual processing results may have different contents and that they may be in different orders despite identical contents. However, different results would lead to the output of an error during voting, even if the actually calculated results (user data) actually match.

The advantage of this embodiment of the invention is that the occurrence of jitter no longer has any effect on the subsequently calculated results. In other words, despite the occurrence of jitter, an overall result is generated which is evaluated as identical in a voting (assuming, of course, that the generated useful content is identical, because otherwise the voting is intended to output an error). This is achieved by ensuring that the messages are always processed in an identical order. The identical order is ensured by a suitable sorting algorithm. Such sorting algorithms are known per se. The sorting criteria can be freely selected, it is only necessary that they are identical for all processing units of a redundancy group so that an identical order of messages is created in the entire redundancy group. For example, all messages can be sorted based on the size of a determined hash value.

According to a variant, the aspects of the invention explained above are determined by the fact that step h) (see above) is carried out as a sub-cycle, with:
  j) the computing entities of each of the plurality N of processing units receiving the messages addressed to them,
  k) the messages then being processed, with the new internal messages generated during processing being stored in at least one intermediate buffer of the processing unit,
  l) subsequently, the messages stored in the intermediate buffer in step k) being sorted taking into account sorting rules which are identical for all of the plurality N of processing units concerned, and
  m) steps j) and k) and l) being repeated, with the computing entities receiving and processing messages addressed to them that were newly created in previous step k), until there are no more unprocessed internal messages addressed to the computing entities in the intermediate buffer.

The measure of storing the messages in an intermediate buffer can be advantageously used to ensure that the messages that were repeatedly stored in step k) are sorted in a combined step before they are fed to the voting (sending of these messages to the voter). This leads advantageously to a further performance gain, as the sorting effort is reduced. The messages can be processed during processing by the aforementioned computing entities without synchronizing them, i.e. in a non-deterministic order. In this case, all computing entities run through at least one, but usually a plurality of recursion loops, which result in all messages to be processed ultimately being taken into account. If the remaining messages that are not to be processed further are sorted, the overall result can be compared by the voter, as this generates a positive result of the voting (i.e. the process can be continued), provided that all or at least the majority of the individual messages each have a message with identical useful content per computing entity.

According to a variant, the aspects of the invention explained above are determined by the fact that the voting is performed in an external computing entity which does not belong to any of the plurality N of redundancy groups.

When, in the context of the present invention, reference is made to an external computing entity, this is to be understood as meaning that this computing entity does not belong to any of the plurality of processing units which contain the computing entities which compute independently of one another for the redundant processing of messages, for example of a redundantly executed application program. This does not mean that the external computing entity must be formed on a different computer or processor or computing core (i.e. no hardware separation is required); software separation by defining redundancy groups and associated message management, for example according to a publish-subscribe procedure, is sufficient. The computing entity can also, for example, be contained in another redundancy group of computing entities in which no computing entities are involved in the calculation of the plurality N of results that are to be fed to the voting.

If the voting is carried out in a computing entity that is external to the processing unit concerned, the messages relating to the overall result to be compared are external messages. In contrast, the messages that are required for redundant processing of the respective tasks and are transferred to the redundancy group for this purpose or are generated during processing in the redundancy group are to be described as internal messages, as these do not have to be fed to an (external) voting and therefore do not have to be sent from the processing unit forming the redundancy group.

According to a variant, the aspects of the invention explained above are determined by the fact that the application programs consist of utility programs aimed at the execution of the technical process and service programs supporting the functions of the computing environment.

In other words, utility programs are those application programs that support the technical process that the method according to the invention is intended to carry out (for example, a railroad application). In other words, they generate messages which are required for the execution of the technical process. These messages are generally further processed by other application programs of the technical process. The technical process can, for example, be a procedure for operating a railroad infrastructure. The railroad infrastructure has a track system with control elements and sensors on the one hand and vehicles with control elements and sensors on the other.

Service programs are those application programs that are not directly involved in the execution of the technical process, but merely ensure the functioning of the computing environment itself. This includes, for example, the voter, which only ensures the functional safety of the computing environment, but does not provide any results that can be used as user data in the technical process.

According to a variant, the aspects of the invention explained above are determined by the fact that all processing units containing computing entities of a redundancy group are each implemented on a different processor or at least each on a different computing core, preferably a different computing core of the same processor.

If computing entities of a redundancy group, and thus also the processing units in which the relevant computing entity is arranged, are each located on different computing cores of the same processor, the external messages that are to be subjected to voting can preferably be sent to a voter that is implemented on the same processor but preferably on computing cores other than those occupied by the processing units or computing entities. This leads advantageously to a physical separation of the processes carried out in parallel by the various processing units and thus to a reduction in hardware-related errors. In addition, the processing operations associated with voting are carried out in the same processor, which also advantageously leads to a performance gain.

According to a variant, the aspects of the invention explained above are determined by the fact that a plurality of computing cores of a processor are combined in at least one of the processing units (preferably in all processing units of at least one redundancy group).

Furthermore, within the processing unit concerned (preferably all processing units of a redundancy group), according to a further embodiment only one of the computing entities of the processing unit is assigned to each computing core. As a result, all the processing operations running in the computing entity concerned run in one and the same computing core, which increases functional safety and further advantageously increases performance.

The performance gain associated with the parallel but temporally independent processing of messages in different processing units is all the greater if the computing entities of such a processing unit are each divided between a plurality of CPUs or a plurality of (virtual) cores for the purpose of parallel and thus more effective processing (this is a primary reason for the use of multi-core applications).

In this advantageous form, all computing entities of a bubble are located on cores of one and the same CPU. The switching paths within a bubble are therefore very fast and the independence of a plurality of bubbles is advantageously utilized by distributing related bubbles across a plurality of servers. The effectiveness of the sum of all these measures can thus also be quantitatively and adequately extended to bubbles with comparatively many subunits ("large" bubbles).

Figure 1:
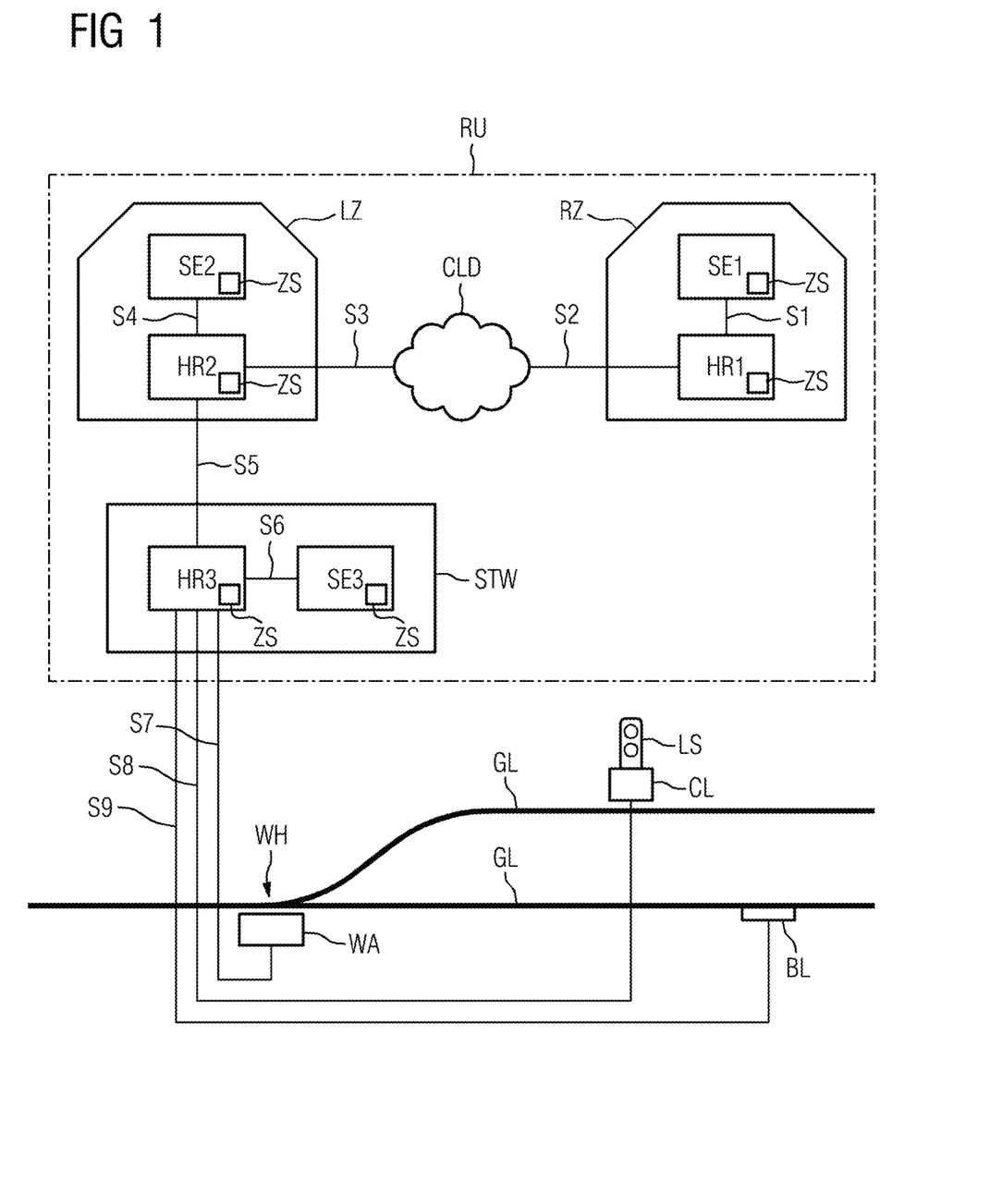
FIG. 1 is an illustration showing an exemplary embodiment of the device according to the invention with its interactions.

In an advantageous form, the individual units of the system for a specific technical process, such as that shown in FIG. 1 for a railroad application, are optimally distributed over a number of computing entities with regard to their quantity structure to be processed—e.g. size of the perimeter of an interlocking (number of point switches, tracks, signals)—depending on the functional processing required for this, so that the work in the bubble is distributed evenly, especially when the workload increases across all sub-units, i.e. more and more scenarios are to be processed almost simultaneously in parallel. In concrete terms, this means that no individual sub-step of a sub-unit is so overloaded that it requires the entire bubble work cycle for complete processing or even forces another bubble work cycle. This makes it possible to maintain stability of the overall response times of a plurality of scenarios to be processed in parallel despite the increase in workload across all processing units, thus enabling effective scaling.

In a further advantageous form, the proposed approach can be extended not only to scaling through distribution with regard to the quantity structure, but also to scaling through distribution with regard to the functionality itself, or can be combined and enforced almost arbitrarily with regard to both aspects. This also includes the division of an originally monolithic work unit. In concrete terms, this means that parallelization and effective and deterministic multicore use is possible for the first time for originally monolithic work units, which was previously not possible on conventional systems.

According to a variant, the aspects of the invention explained above are determined by the fact that the computing entity set up as a voter, as an external computing entity does not belong to a redundancy group from which it is set up to receive messages for voting.

The design of the voter as an external computing entity has the advantage that all messages that are made available for voting by the redundant computing entities must be sent out from the redundancy group as external messages. This makes it possible to separate the processing operations that generate the messages to be compared and the subsequent voting, which means that the method according to the invention can be carried out with a higher degree of fault tolerance.

According to a variant, the aspects of the invention explained above are determined by the fact that it has a plurality of voters.

The use of a plurality of voters leads advantageously to a performance gain in the execution of the method according to the invention. This is due to the fact that if a plurality of redundancy groups send results for the voting in quick succession, these would have to be processed serially if only one voter were available. With a plurality of voters, however, the voting process can be parallelized.

Further details of the invention are described below with reference to the drawing. Identical or corresponding drawing elements are each provided with the same reference signs in the individual figures and are only explained more than once to the extent that there are differences between the individual figures.

The exemplary embodiments explained below are preferred embodiments of the invention. In the exemplary embodiments, the described components of the embodiments each represent individual variants of the invention which are to be considered independently of one another, which also further form the invention independently of one another and are thus also to be regarded as part of the invention individually or in a combination other than that shown. Furthermore, the components described can also be combined with the variants of the invention described above.

Other features which are considered as characteristic for the invention are set forth in the appended claims.

Although the invention is illustrated and described herein as embodied in a method for the computer-aided execution of a technical process in processing units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail and first, particularly to FIG. 1 thereof, there is shown schematically a railroad application that is controlled by a computing environment RU. The railroad application has tracks GL on which various components of the interlocking technology are shown by way of example. There is a point machine WA, which can set a point WH. Furthermore, a balise BL is installed in one of the tracks GL, which can be used to exchange information with trains passing over the balise BL. Finally, a light signal LS is shown, which is controlled by a controller CL.

The computer environment RU can have various host computers, namely a first host computer HR1, a second host computer HR2 and a third host computer HR3, on which applications for controlling the railroad application are distributed in the form of application programs (more on this below). The first host computer HR1 is provided by a computer center RZ and is connected to a first storage unit SE1 via a first interface S1. The computer center RZ can, for example, be operated by a service provider of the railroad operator or by the railroad operator itself. The first host computer HR1 is connected to a private cloud CLD via a second interface S2 so that it is not locally bound to the railroad application. The cloud CLD can be a private cloud CLD, this being understood to be a cloud CLD in which access is restricted to authorized users.

A control center LZ of the railroad operator houses the second host computer HR2, which is also connected to the cloud CLD via a third interface S3. In addition, the second host computer HR2 is connected to a second storage unit SE2 via a fourth interface S4.

The computer environment RU also has, for example, an interlocking STW, which accommodates the third host computer HR3, which is connected to a third storage unit SE3 via a sixth interface S6. In addition, the third host computer HR3 has a fifth interface S5 to the second host computer HR2. In a manner not shown, the third host computer HR3 could also be connected to the cloud CLD. The third host computer HR3 also has a seventh interface S7 to the point machine WA, an eighth interface S8 to the controller CL and a ninth interface S9 to the balise BL.

All interfaces S1 . . . S9 as shown in FIG. 1 can in principle be implemented by cable or by wireless transmission technology, for example radio. The arrangement of the host computers HR1 . . . HR3 is merely an example and can be extended as required for more complex railroad systems. A computing environment RU is defined by the fact that the participating host computers HR1 . . . HR3 can communicate with each other and thus the applications can be processed in a distributed manner on the host computers HR1 . . . HR3, taking into account the available computing capacities. For this purpose, computing entities RP not shown in detail are formed, which are described in more detail below (see FIG. 2 where the computing entities RP are shown).

FIG. 1 also shows various buffer memories ZS, the function of which is explained in more detail below. The buffer memories ZS can either be part of the host computer (e.g. implemented in the working memory of the host computer) or part of the storage devices.

Figure 2:
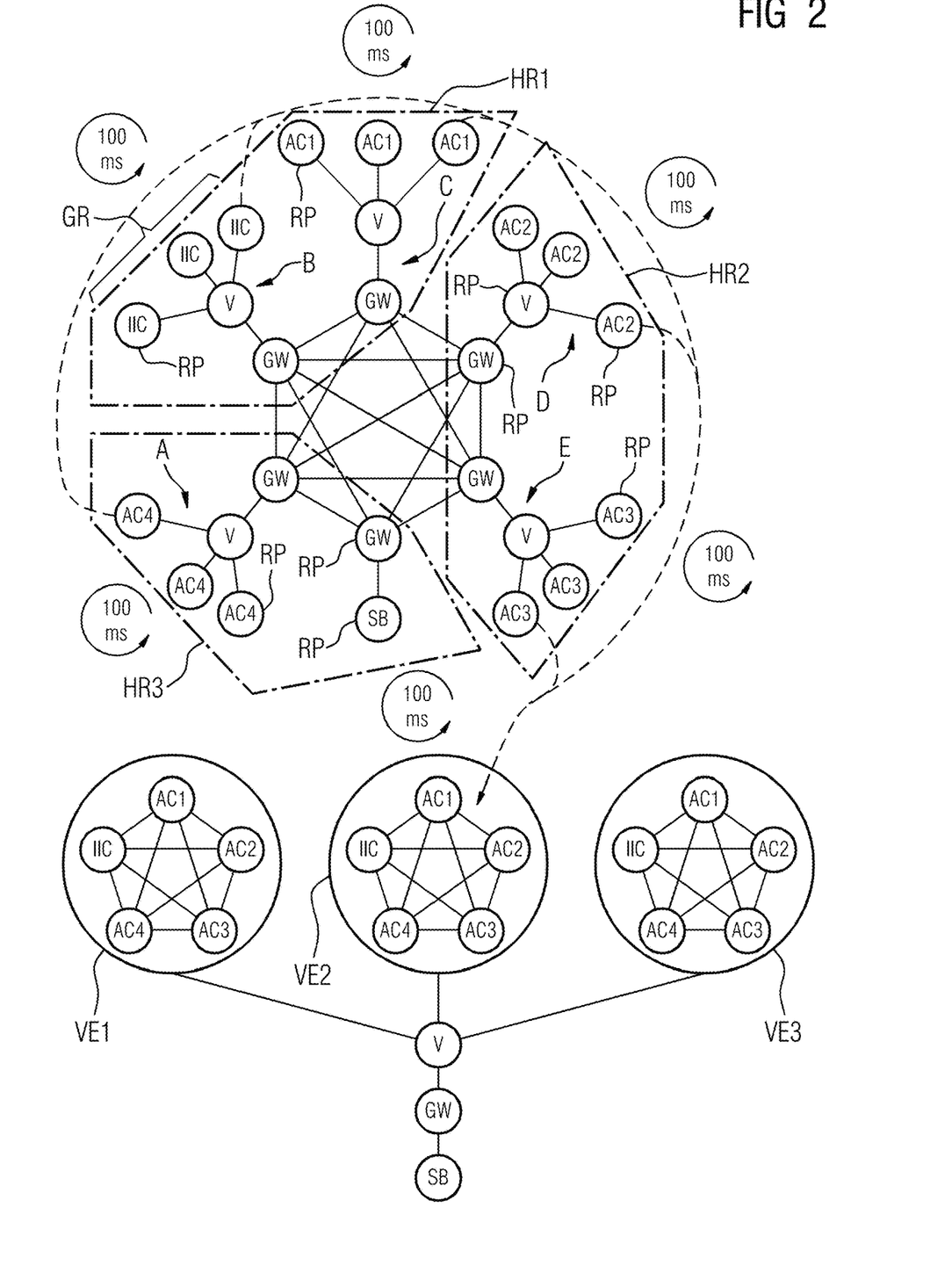
FIG. 2 is block diagram showing an exemplary embodiment of a computing environment for the device according to FIG. 1, wherein the individual computing entities execute program modules which can each run in one or more of the computers shown by way of example and wherein the interfaces shown can accordingly be implemented at the software level in one computer or at the hardware level between different computers.

An approach of an exclusively software-based platform, also referred to as a Distributed Smart Safe System or DS3 for short, pursues according to the prior art, as shown in FIG. 2 above, the implementation of mechanisms for functional safety using only COTS hardware. The procedure for synchronization and control of the determinism for the comparison of the independent work results is essentially based on a strict temporal cycle for the sequence of work cycle and comparison cycle VT, which cannot be clocked to arbitrarily short cycles due to the much higher computing effort for the comparison cycle VT compared to HW synchronization and HW comparison, so that currently, for example, the 100 ms indicated in FIG. 2 represents a realistic cycle duration.

FIG. 2 shows this for five subunits, each with 3 independent computing entities RP, each forming a redundancy group GR-including voter V as comparator and gateway GW for decoupling communication to other subsystems SB, such as the other subunits. The comparison is carried out for each subunit A, B, C, D, E (regardless of which host computer HR1 . . . HR3, indicated by dash-dot lines, these subunits are assigned to) via the voter V assigned to the respective subunit. In the example of a system called Simis W, the computing entities are therefore an interface computer IIC for track elements (also called Interlocking Interface Component, IIC for short), on which primarily service programs are executed, and several application controllers AC1 . . . AC4 (also called Area Component) for processing the utility programs. The computing entities are connected to each other with connection lines, which represent communication links between the computing entities.

However, processing in the strict comparison cycle takes place regardless of whether very little or very much was to be processed in a comparison cycle in the work cycle, which inevitably results in idle times for the computing entities RP. If there is little to calculate in a sub-unit and at the same time the rapid succession of a plurality of such activities is required sequentially for complete processing in the network of sub-units, the entire processing is greatly delayed, as further processing is only possible after a complete comparison cycle (see FIG. 4, below). As a result, although the desired properties with regard to functional safety are sufficiently fulfilled, this is at the expense of performance due to the response times of individual processing operations.

The same five computing entities RP with their respective 3 independent processing units VE1 . . . . VE3 can now be newly clustered in the sense of the invention into three independently operating processing units VE1 . . . VE3, shown as bubbles, but only in conjunction with an upstream connection of a voter V as a comparator and a gateway GW for decoupling the communication to other or neighboring systems, which can preferably also be organized as bubbles (not shown). The bubbles represent the logical processing units VE1 . . . VE3, but not hardware-based boundaries. However, it is advantageous to accommodate computing entities RP of a redundancy group GR on different (virtual) computing cores or processors. For the second processing unit VE2, the regrouping of one computing entity RP from each subunit A . . . E is illustrated by way of example by a dashed arrow, for the first processing unit VE1 and the third processing unit VE3 this is done in the same way.

The clustering as a bubble with physical decoupling of the three redundancy groups GR corresponds to the paradigm shift described above and represents an advantageous use with the associated properties and advantages of asynchronous and parallel processing for the effective use of several computing cores (multi-core) in the bubble concerned.

It can also be seen that the comparison only takes place before sending for external messages that leave the bubble. A cycle of 100 ms is provided for this. It is also possible to provide voter V and gateway GW multiple times (not shown) in order to further exploit the scalability and effectiveness of the resulting multicore system through parallelization.

Figure 3:
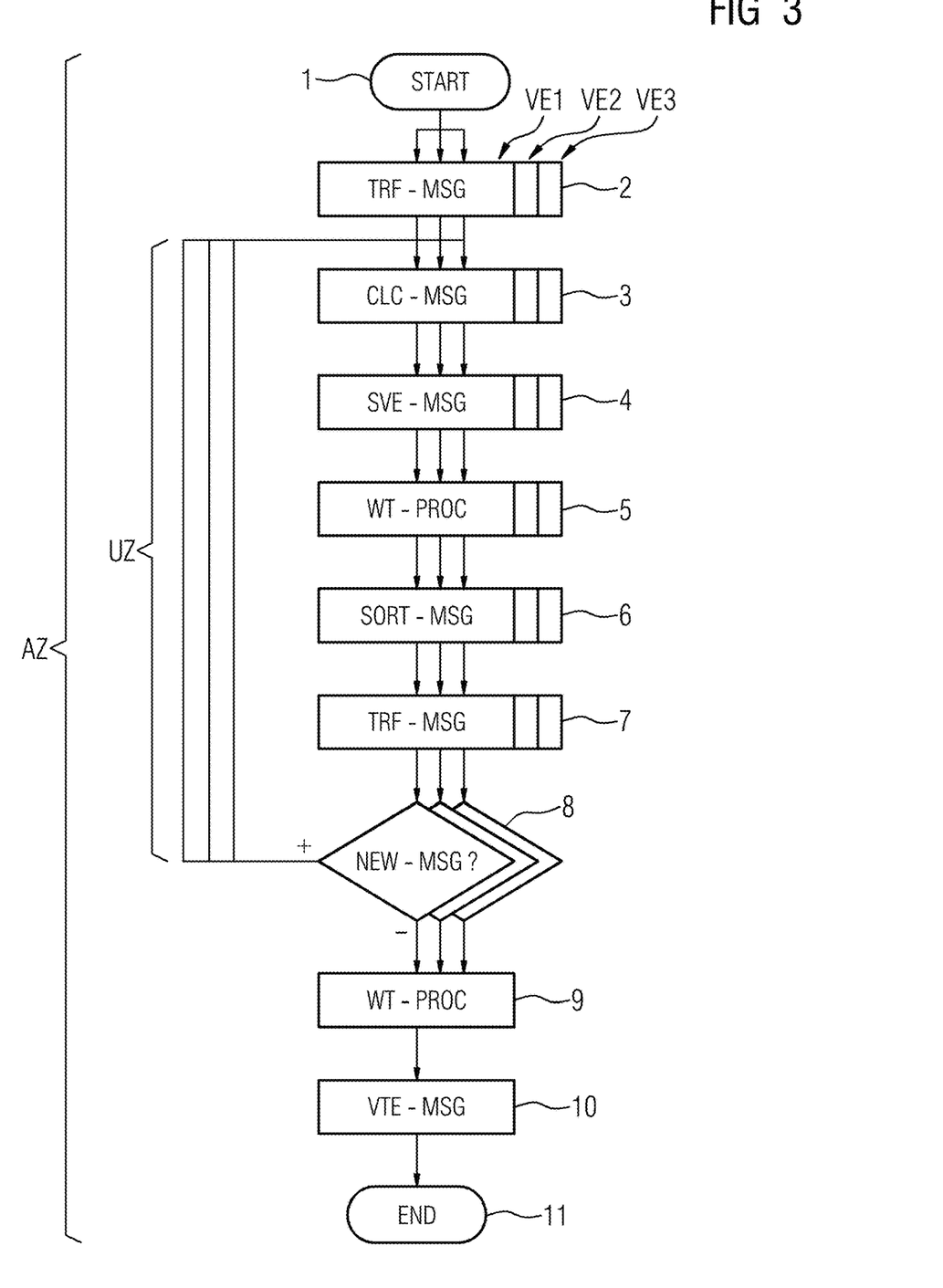
FIG. 3 is a flow chart showing an exemplary embodiment of the method according to the invention, wherein the method steps shown can be implemented individually or in groups by program modules and wherein the computing entities and interfaces according to FIG. 2 are indicated by way of example.

To control the determinism, which is essential for the solution described above, during asynchronous and parallel processing in the bubbles themselves, the following algorithm for sorting and flow control is now performed in each bubble independently, but according to identical criteria for all bubbles, between the computing entities RP (as bubble participants) instead of the original safe comparison and strict comparison cycle in each redundancy group GR, as shown in FIG. 3.

Step 1 (START for short): Start of the (higher-level) work cycle AZ.

Step 2 (TRF-MSG for short): Transfer of all existing input messages to the associated (addressed) computing entities RP in the processing unit VE1 . . . VE3 (bubble) for asynchronous and parallel processing by the computing entities RP.

These incoming messages were received during the last processing cycle and stored externally until being transferred to the current processing cycle. The incoming messages therefore define the work package for the current processing cycle. The quantity and order of the input messages are identical for all processing units VE1 . . . VE3 (bubbles).

Step 3 (CLC-MSG for short): Asynchronous and parallel processing of all transferred internal messages by the computing entities RP. Each computing entity RP runs independently; in the course of this processing, each computing entity RP can generate new messages. These can be internal messages to other computing entities RP (within the same bubble) or external messages to other, external, subsystems SB.

Step 4 (SVE-MSG for short): Intermediate buffering of newly generated messages is required. Newly generated messages within a bubble, both internal messages for other computing entities RP in the bubble and external messages for external subsystems SB, are buffered for the time being and not forwarded directly for processing. This intermediate buffering is necessary so that the messages can later be sorted uniformly in the same way for all bubbles and the voter(s) V (by configuration, i.e. according to deterministic sorting rules), see step 6.

Step 5 (WT-PROC for short): Wait until all computing entities RP have completed their message processing. Only when all computing entities RP in the bubble have finished is a consistent total quantity of the new messages generated fully available in each bubble. This is a prerequisite for the uniform applicability of the sorting rules.

Step 6 (SORT-MSG for short): Sorting of all buffered new messages according to the defined configuration for the computing entities RP. This configuration is identical for all bubbles and determines a uniform processing order for the new messages and therefore also uniform results, particularly in subsequent steps. This is the central feature for controlling the deterministic behavior in all participating bubbles.

Step 7 (TRF-MSG for short): Transfer of all buffered and sorted messages for further asynchronous and parallel processing to the computing entities RP within the bubble (internal messages) and, if necessary, to the voter V outside the bubble (external messages; however, this transfer can also take place after step 9 for all generated messages together if the external messages are buffered in the bubble until then).

Step 8 (NEW-MSG? for short) following query: Renewed asynchronous and parallel processing in a sub-cycle UZ (recursion, see point 3) if there are still (new) sorted internal messages to the computing entities RP.

Step 9 (WT-PROC for short): Reaching the waiting point of the bubble if there are no further sorted internal messages to the computing entities RP.

Step 10 (VTE-MSG for short): The higher-level bubble work cycle is complete in all bubbles, in the sense that all work results have been calculated in each case in the form of external messages. As shown in FIG. 2, this work cycle is executed redundantly in parallel in three bubbles, which is indicated in FIG. 3 by the fact that the elements of the flow diagram are each shown doubly superimposed (with 2 shadows, so to speak) and three parallel flow arrows are shown in each case. But this does not mean that the processes in the 3 bubbles are synchronized. It simply means that all bubbles must have reached the described step 9 before step 10 can be started. The external messages, which behave deterministically due to the application of the sorting rules and must therefore be identical, must now be compared. The external messages from all bubbles are passed to the voter V for comparison and the voting is carried out. If the voting result is positive, the external messages are made available to external subsystems SB via the gateway GW (see FIG. 2).

Step 11 (END for short): the (higher-level) work cycle is terminated. A subsequent AZ work cycle can be started at step 1.

Figure 4:
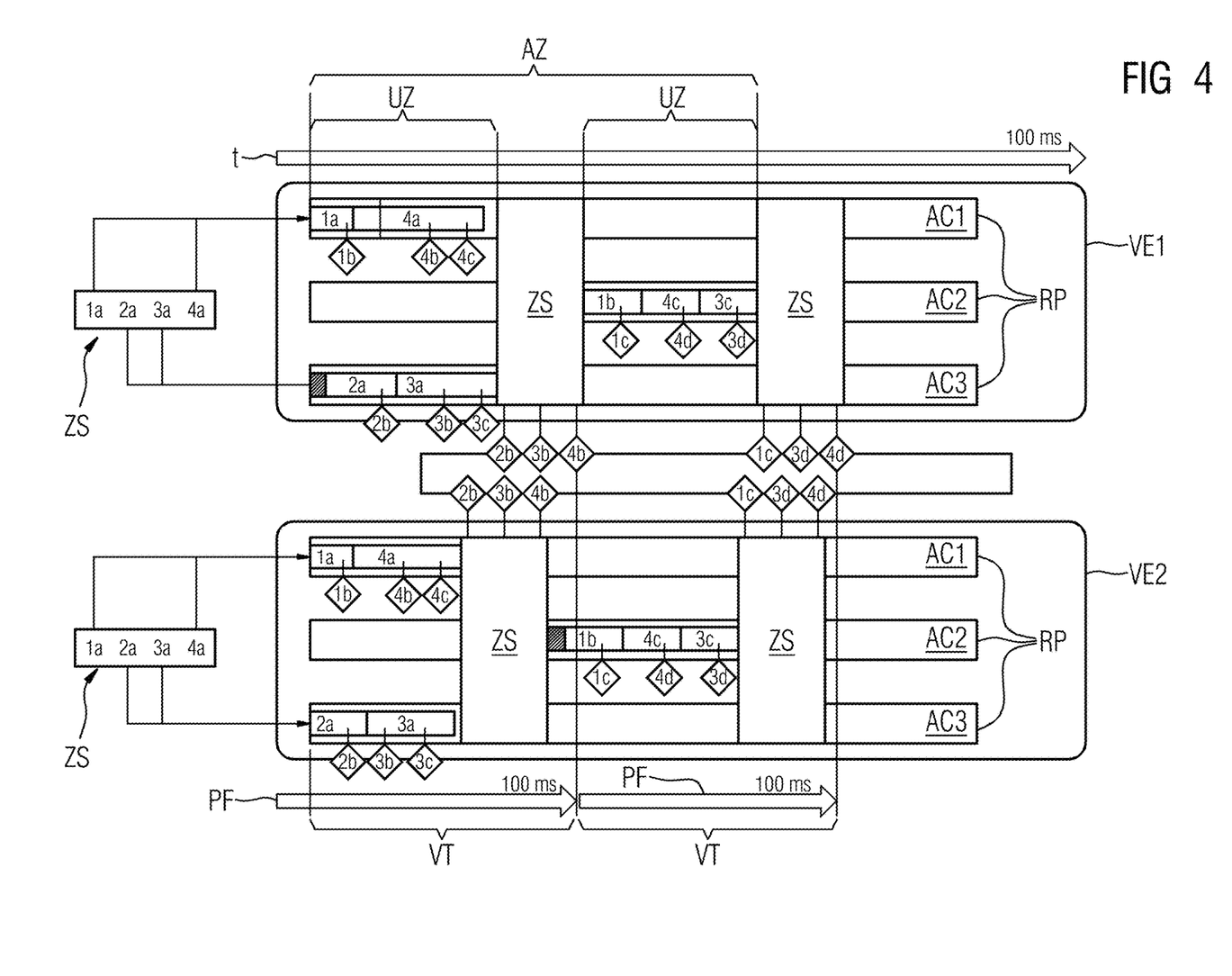
FIG. 4 is an illustration showing a process sequence according to FIG. 3 on a timeline, wherein the processing operations and the generated messages of the first processing unit and the second processing unit according to FIG. 3 are shown by way of example (the third processing unit is omitted for reasons of clarity).

FIG. 4 shows the process sequence according to the invention as shown in FIG. 3 on a time axis ZA. Here, only the first processing unit VE1 and the second processing unit VE2 can be identified. However, the mechanisms explained below apply to the third processing unit VE3 in the same way. This has merely been omitted for the sake of clarity.

Outside the first processing unit VE1 and the second processing unit VE2, a buffer memory ZS is provided as a send buffer which provides, by way of example, four memory locations for messages. These messages are referred to below as 1a, 2a, 3a and 4a. If new messages are generated from these initial messages by processing application programs in the computing entities RP, these are each designated with the following letter, i.e. 1b, 2b, 3b and 4b etc. The generation of these messages is shown to scale in FIG. 4 in relation to the time axis ZA. A buffer memory ZS is also provided in the first processing unit VE1 and in the second processing unit VE2, which is shown twice due to the time sequence within this processing unit. However, the same buffer memory ZS is involved in each case.

1a, 2a, 3a, 4a are transferred in parallel as external messages from the buffer memory ZS, which is configured as a send buffer, to the first processing unit VE1 and the second processing unit VE2. There they are distributed to the computing entities RP, with these consisting of the AC1, AC2 and AC3 already described in FIG. 2. Progress bars in the computing entities RP show when the messages concerned are processed. The processing of the messages results in the generation of new messages. In the case of AC1 these are 1b, 4b and 4c and in the case of AC3 these are 2b, 3b, 3c. These messages are stored in the buffer memories ZS arranged in the first processing device and the second processing device. AC2 is not assigned any tasks relating to the processing of messages for the time being.

Once 1a, 2a, 3a and 4a have been processed, there are no more messages to be processed. The processing of the messages in the first processing unit VE1 and the second processing unit VE2 took place in parallel, with jitter occurring in the first processing unit VE1 which delayed the processing. FIG. 4 shows that 3b was therefore generated after 4b and 3c after 4c in the first processing unit VE1, while in the second processing unit VE2 the messages were generated almost simultaneously. However, this has no effect on the planned comparison of the messages because the messages stored in the buffer memory ZS are sorted according to sorting rules in a manner that is not described in more detail before a comparison. This means that the new external messages are to be sent from the first processing unit VE1 and the second processing unit VE2, namely 2b, 3b and 4b, and reach the voter V at different times but in the same order. Therefore, the result of the voting will be positive if these messages are identical, as they are checked in the same order.

The newly generated messages, which are internal, namely 1b, 4c and 3c, are then processed in AC2 and lead to the generation of the new messages 1c, 4d and 3d. This time, these messages are also generated later in the second processing unit VE2 than in the first processing unit VE1 due to the jitter occurring there. However, these messages are also stored in the buffer memory ZS and are only sorted after all internal messages have been processed. In Voter V, the messages are therefore compared in the order 1c, 3d and 4d and their correspondence is determined. There are then no more new messages, as all newly generated messages were external. The work cycle AZ is now complete.

As an example, the sorting rules used are selected according to the index of the messages. They are first sorted by Arabic numerals and then by the subsequent letters. These sorting rules have only been chosen to illustrate the sorting mechanism. In reality, the sorting rules are preferably based on the content of the messages or hash values, which are created taking into account the content of the messages.

To illustrate the advantage over the prior art, a process as described above is shown in the lower part of FIG. 4. Two arrows PF are used here, which are intended to represent two work cycles according to the prior art. However, in contrast to the illustration explained above using the time axis ZA, this illustration is not to scale, but is merely intended to illustrate the difference. It becomes clear that two comparison cycles VT of 100 ms each are required to complete the process and therefore twice the processing time is required according to the exemplary embodiment (in reality, the effect is actually many times longer). Each comparison cycle VT must wait for the last available message to be processed in each of the computing entities RP. As a comparison is only ever made between the work results of the respective computing entity RP in the manner not shown, the order of the work results is deterministic even if jitter occurs and therefore leads to positive results in voting. To achieve this, the work results must be available in full in the form of new messages for each computing entity RP of a redundancy group GR, which is not shown in detail. The sub-units are each formed by a redundancy group GR of computing units.

In this example, the effort for the mechanism described above for establishing and guaranteeing the necessary determinism in all participating bubbles shifts in part from several comparison cycles VT to a single work cycle AZ and requires resources there, which are available due to the distribution of the computing entities RP to several cores and were unused in the approach with several comparison cycles VT due to the barely utilized multiple work phases. In addition, this effort is lower in that it does not have to be executed in a functionally safe manner and can therefore be processed independently and efficiently in each individual bubble. The fact that this is the case and that the disclosure of errors is implicitly subject to the final comparison by the voter V represents a further advantage.

In a further advantageous form, the options for configuring the algorithm for sorting and flow control can be extended and refined by means of priorities, separate buffer memories ZS as send buffers to configured receivers, separate buffer memories ZS as receive buffers of configured transmitters, etc., so that the working behavior of a bubble can be optimally designed according to its dynamic characteristics, depending on the way in which the computing entities RP work together in each case.

The following is a summary list of reference numerals and the corresponding structure used in the above description of the invention:

AC1 . . . AC4 application controller
AZ work cycle
BL balise
CL controller
CLD cloud
GL rails
GR redundancy group
GW gateway
HR1 first host computer HR2 second host computer
HR3 third host computer
IIC interface computer
LS light signal
LZ control center
PF arrows
RP computing entity
RU computing environment
RZ computer center
S1 first interface
S2 second interface
S3 third interface
S4 fourth interface
S5 fifth interface
S6 sixth interface
S7 seventh interface
S8 eighth interface
S9 ninth interface
SB subsystem
SE1 first storage unit
SE2 second storage unit
SE3 third storage unit
STW interlocking
UZ sub-cycle
V voter
VE1 .... VE3 processing unit
VT comparison cycle
WA point machine
WH point
ZA time axis
ZS buffer memory

The invention claimed is:

1. A method for a computer-aided execution of a technical process, which comprises the steps of:
   a) executing application programs redundantly in a redundancy group containing a plurality N of computing entities and thereby calculate a plurality N of redundant results;
   b) carrying out a comparison of a plurality N of messages containing the redundant results in a voting;
   c) using a majority of messages for further execution of the technical process in an event that the majority of the messages contain identical results;
   d) forming processing units from a plurality N of the redundancy groups each having the plurality N of computing entities, a plurality of different said computing entities is combined in each of the processing units, wherein none of the processing units contains a plurality of said computing entities from one and a same said redundancy group;
   e) comparing a respectively generated plurality N of redundant messages in the voting if the redundant messages are to be sent as external messages to the computing entities, which do not belong to the processing units, in which the redundant messages were generated;
   f) carrying out no voting for the redundant messages that are exchanged as internal messages between the computing entities within a processing unit;
   g.1) operating a plurality of N the processing units in work cycles;
   g.2) transferring, at a beginning of each work cycle, messages required for the work cycle and addressed to the computing entities of the processing unit concerned to the processing unit;
   h) subsequently processing all the messages required for an execution of the application programs by the computing entities in the plurality N of processing units in identical order, wherein new redundant messages are generated; and
   i) comparing the new redundant messages with each other in the steps b), c), d) and e).

2. The method for the computer-aided execution according to claim 1, wherein the step h) is carried out in sub-cycles, wherein:
   j) the computing entities of each of the plurality N of processing units receive the messages addressed to them;
   k) the messages are then processed, with new internal messages generated during processing being stored in at least one intermediate buffer of a processing unit of the processing units;
   l) Subsequently, the messages stored in the at least one intermediate buffer in step k) are sorted taking into account sorting rules which are identical for all of the plurality N of processing units concerned; and
   m) steps j) and k) and l) are repeated, with the computing entities receiving and processing the messages addressed to them that were newly created in previous step k), until there are no more unprocessed internal messages addressed to the computing entities in the at least one intermediate buffer.

3. The method for computer-aided execution according to claim 1, which further comprises performing the voting in a computing entity which does not belong to any of the plurality N of redundancy groups.

4. The method for computer-aided execution according to claim 1, wherein the application programs consist of utility programs aimed at the computer-aided execution of the technical process and service programs supporting functions of a computing environment.

5. The method for computer-aided execution according to claim 1, wherein all the processing units containing the computing entities of a redundancy group are each implemented on a different processor or at least each on a different computing core.

6. A computing environment, comprising:
   a plurality of computing entities, wherein a plurality N of the computing entities are combined to form one of a plurality of redundancy groups and all said computing entities in each redundancy group of said redundancy groups are set up to execute an application program redundantly;
   the computing environment being further divided into a plurality N of processing units derived from said redundancy groups, wherein:
   a) a plurality of said computing entities are combined to form each of said processing units;
   b) none of said processing units contains a plurality of said computing entities from one and a same said redundancy group;
   a plurality of computing cores of a processor are combined in at least one of said processing units;
   the computing environment having a computing entity from said computing entities that is set up:
   c) to compare in a voter in a voting a plurality N of redundant messages generated by said computing entities, in an event that the redundant messages leave one of said processing units as external messages;
   d) not to compare the redundant messages in an event that the redundant messages are exchanged as internal messages between said computing entities within said processing unit;

said plurality of N processing units operates in work cycles, wherein:

e) at a beginning of each work cycle, messages required for the work cycle and addressed to said computing entities of said processing unit concerned are transferred to said processing unit;

f) subsequently, all the messages required for an execution of the application programs are processed by said computing entities in said plurality N of processing units in identical order, wherein new redundant messages are generated;

g) the new redundant messages are then compared with each other in the step c).

7. The computing environment according to claim 6, wherein said computing entity set up as said voter is an external computing entity that does not belong to said redundancy group from which it is set up to receive redundancy messages for voting.

8. The computing environment according to claim 6, wherein said voter is one of a plurality of voters.

9. A non-transitory computer readable medium having computer-executable instructions which when executed on a computer perform the method according to claim 1.

* * * * *

UNITED STATES PATENT AND TRADEMARK OFFICE
CERTIFICATE OF CORRECTION

| | | |
|---|---|---|
| PATENT NO. | : 12,443,451 B2 | Page 1 of 1 |
| APPLICATION NO. | : 18/901209 | |
| DATED | : October 14, 2025 | |
| INVENTOR(S) | : Sonja Steffens et al. | |

It is certified that error appears in the above-identified patent and that said Letters Patent is hereby corrected as shown below:

In the Claims

Claim 2, Column 18, Lines 16-19 should read as follows:
1) subsequently, the messages stored in the at least one intermediate buffer in step k) are sorted taking into account sorting rules which are identical for all of the plurality N of processing units concerned; and Signed and Sealed this
Ninth Day of December, 2025

John A. Squires
*Director of the United States Patent and Trademark Office*